United States Patent
Medina Luna et al.

(10) Patent No.: US 10,384,580 B2
(45) Date of Patent: Aug. 20, 2019

(54) MOVEABLE TRAY ASSEMBLY

(71) Applicant: FORD GLOBAL TECHNOLOGIES, LLC, Dearborn, MI (US)

(72) Inventors: Maria Fernanda Medina Luna, Naucalpan (MX); Omar Mendoza Vera, Tlalnepantla (MX); John A. Shinska, Dearborn, MI (US); Luis Pablo Rivera Paredes, Alvaro Obregon (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/416,463

(22) Filed: Jan. 26, 2017

(65) Prior Publication Data
US 2018/0208094 A1    Jul. 26, 2018

(51) Int. Cl.
*B60N 3/00* (2006.01)
*B60N 3/10* (2006.01)
*B60R 7/04* (2006.01)
*B60N 2/75* (2018.01)

(52) U.S. Cl.
CPC ............ *B60N 3/002* (2013.01); *B60N 2/793* (2018.02); *B60N 3/10* (2013.01); *B60R 7/04* (2013.01)

(58) Field of Classification Search
CPC .......... B60N 3/002; B60N 2/793; B60N 3/10; B60R 7/04
USPC ....................................................... 224/544
See application file for complete search history.

(56) References Cited

U.S. PATENT DOCUMENTS

| | | | |
|---|---|---|---|
| 3,939,887 A | 2/1976 | Scarnato | |
| 5,601,268 A | 2/1997 | Dunchock | |
| 6,109,580 A * | 8/2000 | Stern | A47G 23/06 248/311.2 |
| 6,533,233 B2 | 3/2003 | Thomas | |
| 6,543,637 B1 | 4/2003 | Osborn | |
| 6,732,990 B2 | 5/2004 | Hudson | |
| 7,344,056 B2 | 3/2008 | Shelmon et al. | |
| 8,550,550 B2 | 10/2013 | Cassese et al. | |
| 8,641,004 B2 * | 2/2014 | Miklas | B60N 3/102 224/250 |
| 8,714,613 B1 * | 5/2014 | Gillis | B60R 7/04 296/24.34 |

(Continued)

FOREIGN PATENT DOCUMENTS

DE     19510846 A1    9/1996
EP      1508522 A1    2/2005

(Continued)

OTHER PUBLICATIONS eBay Item No. 311650717083 for "Car Snack Tray Food Drink Bottle Rack Cup Holder Mount Stand Storage Organizer," http://www.ebay.com/itm/Car-Snack-Tray-Food-Drink-Bottle-Rack-Cup-Holder-Mount-Stand-Storage-Organizer/-311650717083, printed Oct. 26, 2016.

*Primary Examiner* — Peter N Helvey
(74) *Attorney, Agent, or Firm* — Vichit Chea; Brooks Kushman P.C.

(57) ABSTRACT

A moveable tray assembly for a vehicle includes a tray portion and a collapsible cup portion coupled to the tray portion. The cup portion is extendible downward from the tray portion and sized to fit within a cupholder recess. A floor of the tray portion extends outwardly from a top circumference of the cup portion to support items. The floor has a length and width greater than 3"×4".

19 Claims, 2 Drawing Sheets

(56) References Cited

U.S. PATENT DOCUMENTS

| | | | |
|---|---|---|---|
| 9,016,491 B2* | 4/2015 | Blum | A47G 19/2205 |
| | | | 220/4.33 |
| 9,333,920 B2 | 5/2016 | Skapof et al. | |
| 9,440,573 B1* | 9/2016 | Dunham | B60N 3/107 |
| 2002/0043603 A1* | 4/2002 | Thomas | B60N 3/103 |
| | | | 248/311.2 |
| 2002/0185578 A1* | 12/2002 | Hudson | B60N 3/002 |
| | | | 248/311.2 |
| 2003/0121881 A1 | 7/2003 | Higuchi | |
| 2004/0069740 A1 | 4/2004 | Athalye | |
| 2005/0127073 A1* | 6/2005 | Kusuma | B65D 21/086 |
| | | | 220/6 |
| 2005/0139573 A1 | 6/2005 | Higuchi | |
| 2010/0314387 A1 | 12/2010 | Cassese et al. | |
| 2011/0036806 A1 | 2/2011 | Gregg et al. | |
| 2011/0215605 A1* | 9/2011 | Spitler | B60N 3/00 |
| | | | 296/24.34 |
| 2012/0097724 A1* | 4/2012 | Standfest | B60N 3/103 |
| | | | 224/545 |
| 2015/0360923 A1 | 12/2015 | Giuffrida et al. | |

FOREIGN PATENT DOCUMENTS

| | | |
|---|---|---|
| FR | 2259754 A2 | 8/1975 |
| JP | 2002316572 A | 10/2002 |
| WO | 9707028 A1 | 2/1997 |
| WO | 2016162868 A1 | 10/2016 |

\* cited by examiner

MOVEABLE TRAY ASSEMBLY

TECHNICAL FIELD

The present disclosure relates to moveable tray assemblies for motor vehicles.

BACKGROUND

Motor vehicles may include interior storage areas for beverages, coins, and other personal items. Interior storage areas may include cup holders and trays that are built into, or attached to, one or more interior components of the vehicle. It may be desirable to have a moveable tray to allow access to interior storage areas when needed without having to remove items stored in the tray prior to moving.

SUMMARY

According to an embodiment, a moveable tray assembly for a vehicle includes a tray portion and a collapsible cup portion coupled to the tray portion. The cup portion is extendible downward from the tray portion and sized to fit within a cupholder recess. A floor of the tray portion extends outwardly from a top circumference of the cup portion to support items. The floor has a length and width greater than 3"×4".

According to another embodiment, a moveable tray assembly for a vehicle includes a tray portion shaped to cooperate with a selectively closeable storage compartment such that the tray portion is disposed within a cavity of the compartment in a first position. The assembly further includes a collapsible cup portion coupled to a floor of the tray portion. The cup portion is extendible to fit within a cupholder recess to secure the tray portion in a second position.

According to another embodiment, a moveable tray assembly for a vehicle includes a tray portion and a collapsible cup portion with a top circumference coupled to a floor of the tray portion. The cup portion is shaped to fit within a cupholder recess. The floor has first and second portions extending laterally outwardly from two diametrically opposed points along the top circumference. The first and second portions each have a lateral dimension of at least 0.2".

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
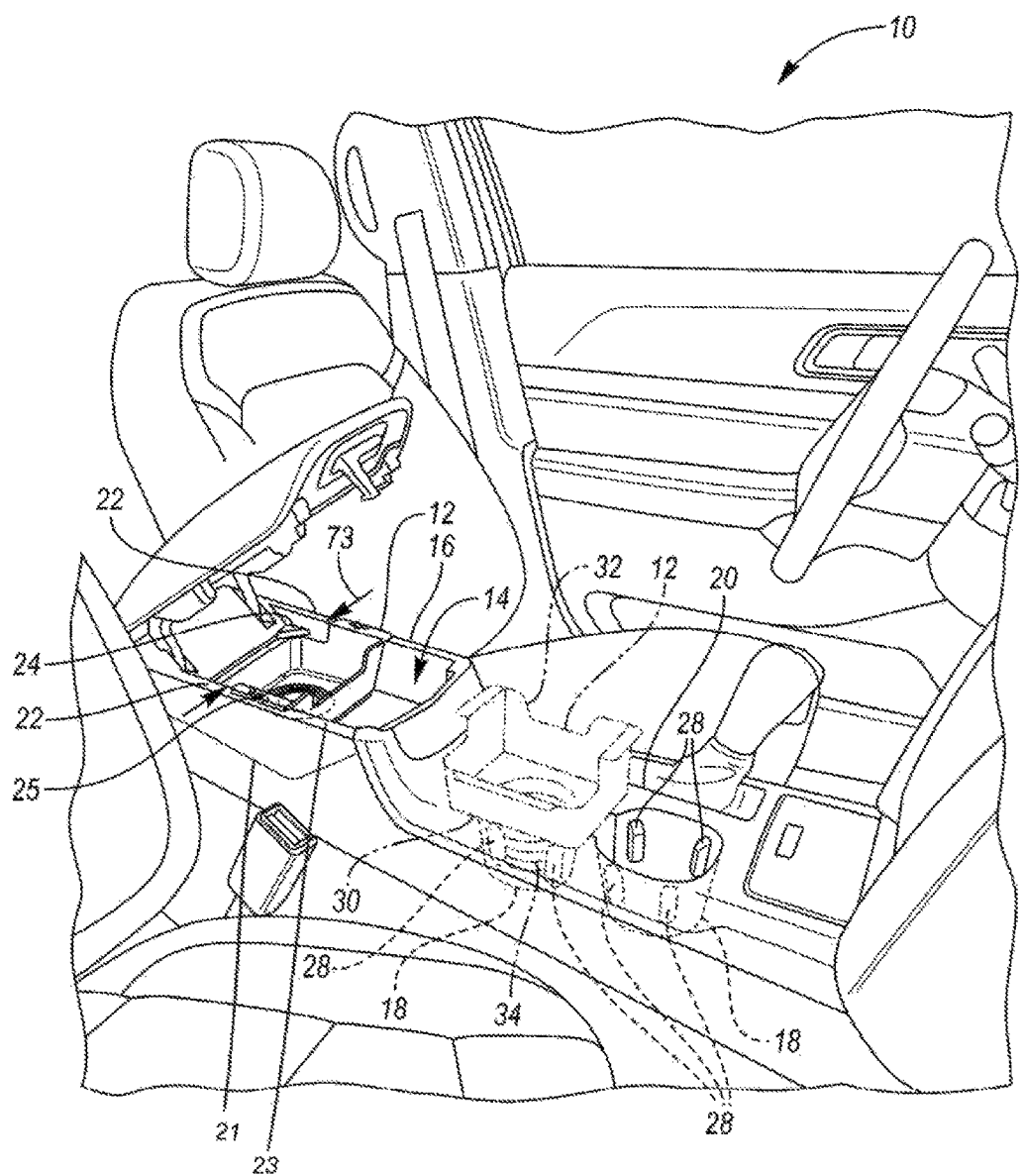
FIG. 1 is a perspective view of an interior of a vehicle with a moveable tray assembly.

FIG. 1 is a perspective view of an interior of a vehicle 10 with a moveable tray assembly 12. Assembly 12 may be configured for storing items and to be moveable between at least two positions within the interior of the vehicle 10. In one embodiment, assembly 12 may be disposed within a cavity 14 of a selectively closeable storage compartment 16 in a first position and within a cupholder recess 18 in a second position. In one embodiment, upon moving assembly 12 from compartment 16 to recess 18, a user may rotate assembly 12 ninety degrees counterclockwise (relative to a central vertical axis of assembly 12) so that assembly 12 does not laterally project past the console 20 into the driver and passenger seating areas. In other embodiments, assembly 12 may remain in the same angular orientation or be rotated by a different degree and/or in a different direction. Furthermore, although assembly 12 is illustrated as being disposed in a rear cupholder recess, assembly 12 may also be disposed in a front cupholder recess or in other cupholder recesses within vehicle 10.

As illustrated, compartment 16 may be a center armrest and may include lateral edges 22 for supporting assembly 12 such that assembly 12 may be suspended within cavity 14. The lateral edges 22 form a rim 23 of the cavity 14. The lateral edges 22 are formed on the tops of the sidewalls 21. Compartment 16 may also include corner gussets 24 projecting into the cavity 14 to help stabilize assembly 12 while in cavity 14. In addition, compartment 16 may include pins 25 projecting upwards from lateral edges 22 to mate with apertures 26 (FIG. 3) of assembly 12. Pins 25 and apertures 26 may be positioned such that assembly 12 can only be securely positioned in a certain orientation within cavity 14. Furthermore, by having a different number of pins 25 and apertures 26 on the lateral sides, assembly 12 can only be positioned in a certain orientation within cavity 14 (i.e., assembly 12 may not be securely positioned within compartment 16 if turned 180 degrees). Cupholder recess 18 may include fingers 28 projecting radially inwardly from a perimeter wall 30 of cupholder recess 18 to secure a cup or assembly 12 within recess 18. Fingers 28 may be spring-loaded and biased radially inwardly.

Still referring to FIG. 1, assembly 12 may include a tray portion 32 and a collapsible cup portion 34 coupled to the tray portion 32. Tray portion 32 may be shaped to cooperate with compartment 16 as discussed above. In one embodiment, tray portion 32 may remain upright to retain items stored therein upon moving assembly 12 between compartment 16 and recess 18. The cup portion 34 may be extendible downward from the tray portion 32 from a collapsed position to an extended position as described in more detail below in connection with FIGS. 2 and 3. In the extended position, the cup portion 34 may be sized and/or shaped to fit within cupholder recess 18. Fingers 28 may contact and secure cup portion 34 when assembly 12 is inside cup holder recess 18.

Moveable tray assembly 12 allows a user to store a large phone (or other items that may be too large for cupholder recess 18) within or on top of cupholder recess 18 inside tray portion 32, and if cupholder recess 18 is subsequently needed to store a beverage or some other item, the user may move assembly 12 into compartment 16 without having to remove the items already stored therein. Furthermore, cup portion 34 may be extended or collapsed when inside compartment 16. As such, if cavity 14 of compartment 16 is needed to store other items, cup portion 34 of assembly 12 may be collapsed to provide more space for the other items. Alternatively, cup portion 34 may be in an extended position when inside compartment 16.

Figure 2:
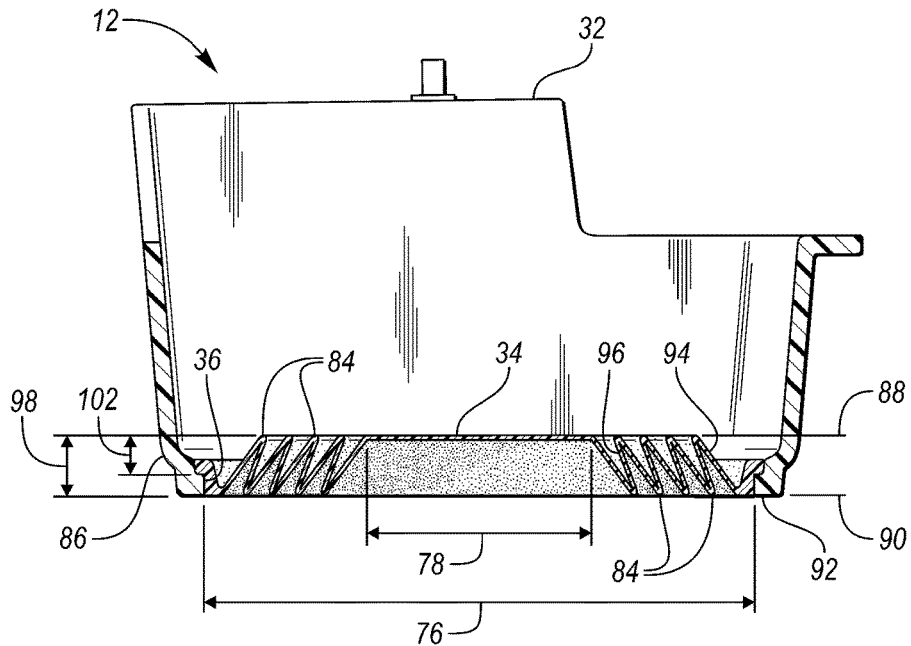
FIG. 2 is a cross-sectional view of the moveable tray assembly of FIG. 1 in a collapsed position.
Figure 3:
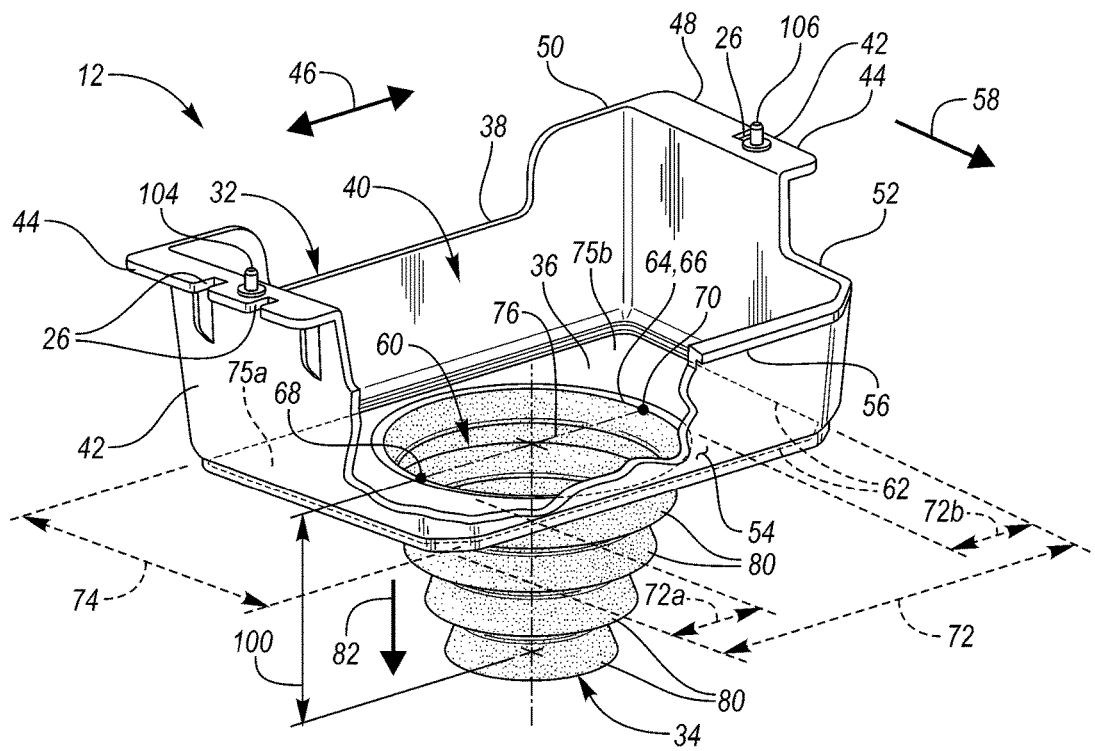
FIG. 3 is a perspective view of the moveable tray assembly of FIG. 1 in an expanded position.

FIG. 2 is a cross-sectional view of the moveable tray assembly 12 of FIG. 1 in the collapsed position. FIG. 3 is a perspective view of the moveable tray assembly 12 of FIG. 1 in the expanded position. A portion of tray portion 32 has been removed in FIG. 3 to make the top of cup portion 34 visible. Referring to FIG. 3, tray portion 32 may include a floor 36 and a perimeter wall 38 extending upwards from floor 36 to define a tray-portion cavity 40. Perimeter wall 38 may have sidewalls 42 with flanges 44 outwardly extending therefrom in lateral directions 46 to secure assembly 12 in cavity 14 of compartment 16 (FIG. 1). Sidewalls 42 may each include a raised portion 48 coupled to a front wall 50 (and from which flanges 44 extend) and a lower portion 52 coupled to a rear wall 54. Front wall 50 may be slotted to facilitate gripping of assembly 12 upon moving between compartment 16 and cupholder recess 18 (FIG. 1). Rear wall 54 may be beveled at its ends (coupled to sidewalls 42) and include a flange 56 extending outwardly in a rearward direction 58. Cup portion 34 may have a cup-portion cavity 60 in the extended position. In one embodiment, a volume of tray-portion cavity 40 may be greater than a volume of cup-portion cavity 60. Furthermore, a cross-sectional area 62 of a bottom of tray-portion cavity 40 may be greater than a cross-sectional area 64 of a top of cup-portion cavity 60, where the cross-sectional areas are taken along horizontal planes.

Still referring specifically to FIG. 3, floor 36 of tray portion 32 may extend outwardly from a top circumference 66 of cup portion 34 to support items. In one embodiment, floor 36 may extend laterally outwardly from two diametrically opposed points 68, 70 along top circumference 66. Floor 36 of tray portion 32 may be a planar surface and have a length 74 and a width 72 greater than a top diameter 76 of cup portion 34. In one embodiment, length 74 and width 72 may be at least 3"×4". In some embodiments, length 74 may be equal to or greater than width 72. In one embodiment, length 74 and width 72 may be at least 5.1". In one embodiment, the width 72 may be selected to fit within cavity 14, such that the sidewalls 42 of tray portion 32 are disposed proximate to the inner sidewalls of compartment 16. Width 72 of tray portion 32 may be sized to fit within a width 73 (FIG. 1) of cavity 14. Moreover, floor 36 may have portions 75a, 75b extending laterally outwardly from points 68, 70, each portion 75a, 75b having a lateral dimension 72a, 72b of at least 0.2". In other embodiments, lateral dimensions 72a, 72b may be the same or different and be less than 0.2". In the illustrated embodiment, sidewalls 42, rear wall 54, and front wall extends upwards at an angle from floor 36; however, in other embodiments, the walls may extend vertically (ninety degrees from floor 36) or at a different angle(s).

In one embodiment, tray portion 32 may be rigid, and cup portion 34 may be flexible. In one embodiment, cup portion 34 may be more flexible then tray portion 32. Tray portion 32 may comprise plastic, polypropylene (PP), polyamide (PA), nylon, acrylonitrile butadiene and styrene (ABS), polyethylene terephthalate (PBT), polycarbonate (PC) and/or styrene acrylonitrile copolymer (SAN). Cup portion 34 may comprise thermoplastic rubber, thermoplastic vulcanizates (ETPV or TPV), nitrile, polyacrylate rubber (e.g., ACM), thermoplastic elastomers (e.g., SEBS), and/or thermoplastic polyurethane elastomer (TPU). In another embodiment (for example and without limitation), the tray portion and cup portion comprise the same material but have different thicknesses to achieve the level of flexibility required for collapsing of the cup portion.

In the extended position, cup portion 34 may be generally funnel-shaped with top diameter 76 being greater than a bottom diameter 78 (diameters depicted in FIG. 2). In the illustrated embodiment, top diameter 76 is approximately 4.75", and bottom diameter 78 is approximately 2.75". Cup portion 34 may be generally frustoconical in the extended position and comprise a plurality of interconnected concentric frustoconical rings 80 forming a pleated wall. As illustrated in FIG. 3, in the extended position, rings 80 may form a cross-sectional zig-zag shape that slopes radially inwardly in a downward direction 82. With reference to FIG. 2, each ring 80 may be pivotable relative to neighboring rings 80 about their respective joints 84 such that cup portion 34 collapses into a bottom area 86 of tray portion 32 in the collapsed position. Joints 84 may be generally disposed along horizontal planes 88, 90 in the collapsed position. Horizontal plane 90 may coincide with a bottommost surface 92 of tray portion 32. A topmost ring 94 of the plurality may have a top diameter 76 greater than a bottom diameter 78 of a bottommost ring 96 of the plurality such that the bottommost ring 96 may be disposed within topmost ring 94 when the cup portion 34 is in the collapsed position, with the remaining rings 80 in the plurality being disposed between the topmost and bottommost rings 94, 96. In one embodiment, cup portion 34 may reside entirely within bottom area 86 of tray portion 32 in the collapsed position. Cup portion 34 may be displaced to reside within the bounds of tray portion 32 in the collapsed position. A volume of cup-portion cavity 60 may decrease when cup portion 34 moves from the extended position to the collapsed position. Furthermore, cup portion 34 may be collapsible into bottom area 86 of tray portion 32 so as not to interfere substantially with tray-portion cavity 40 or its volume. A volume of tray-portion cavity 40 may be generally unchanged when cup portion 34 moves from the extended position to the collapsed position. In one embodiment, a collapsed height 98 of the cup portion 34 in the collapsed position may be less than an extended height 100 of the cup portion 34 in the extended position. In one embodiment, extended height 100 may be in the range of 2.75" to 3". In the collapsed position, cup portion 34 may project upwards past floor 36 of tray portion 32 by a distance 102 of less than 0.3" to 0.5". In one embodiment, distance 102 may be less than a quarter of extended height 100.

Still referring to FIG. 3, tray portion 32 may also include protrusions 104, 106 that extend upwards from a top surface of flanges 44. Bumpers may be fitted over protrusions 104, 106 and cooperate with corresponding holes in the underside of the lid of compartment 16. Bumpers may comprise rubber and aid in stabilizing tray portion 32.

One of ordinary skill in the art will understand that the illustrated cup portion 34 is one example of a collapsible cup portion and that there are a variety of ways to make the cup portion collapsible. In some embodiments, the cup portion may be a pleated collapsible structure. In the illustrated embodiment, cup portion 34 is pleated and frustoconical and includes concentric rings that alternate being oriented radially inwardly and outwardly forming a pleated wall. In other embodiments, the cup portion may be a collapsible spiral structure or a collapsible non-circular structure (e.g., rectangular) as shown in the following patent references, which are incorporated by reference as though fully set forth herein: US 2011036806, EP 1508522 A1, US 2004069740, DE 19510846 A1.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
   a closeable storage compartment including sidewalls defining a cavity, wherein the sidewalls have upper lateral edges that form a rim of the cavity;
   a console having a cupholder; and
   a moveable tray assembly including:
      a tray portion shaped to dock within the cavity and having a floor and opposing lateral sidewalls extending upwardly from the floor and cooperating with the floor to define a tray-portion cavity, each of the sidewalls having a flange extending outwardly therefrom in a lateral direction, and
      a collapsible cup portion coupled to the floor, the cup portion having a plurality of interconnected, concentric rings forming a pleated wall that has a topmost ring of the concentric rings attached to the floor and a bottommost ring of the concentric rings, wherein the cup portion is moveable between a collapsed position in which the bottommost ring is disposed radially within the topmost ring to place the cup portion proximate to the floor and an extended portion in which the pleated wall is unfolded to have the bottommost ring depend downwardly from the floor; wherein
   the moveable tray assembly has a first position in which the tray portion is supported within the cavity via engagement of bottom surfaces of the flanges with the upper lateral edges and the cup portion in the collapsed position, and a second position in which the cup portion is in the extending position and received within the cupholder to dock the tray portion to the console.

2. The vehicle of claim 1, wherein the topmost ring has a top diameter greater than a bottom diameter of the bottommost ring.

3. The vehicle of claim 1, wherein the cup portion resides entirely within a bottom area of the tray portion when in the collapsed position.

4. The vehicle of claim 1, wherein the tray portion further includes a perimeter wall extending upwards from the floor to define a tray-portion cavity.

5. The vehicle of claim 1, wherein the closeable storage compartment defines lateral edges, and wherein the tray portion defines flanges that engage with the lateral edges to support the tray assembly within the closeable storage compartment when in the first position.

6. The vehicle of claim 1, wherein the collapsible cup portion has a frustoconical shape when in the extended position.

7. The vehicle of claim 1, wherein the closeable storage compartment defines pins and the tray portion defines holes that receive the pins when in the first position.

8. The vehicle of claim 1, wherein the closeable storage compartment defines gussets that engage with the tray portion when in the first position.

9. The vehicle of claim 1, wherein the moveable tray assembly is designed to be in a first rotational orientation when in the first position and in a second rotational orientation when in the second position, wherein the first and second rotational orientation is about a central vertical axis of the moveable tray assembly.

10. The vehicle of claim 9, wherein a difference between the first and second rotational orientations is 90 degrees about the central vertical axis of the moveable tray assembly.

11. The vehicle of claim 1, wherein a pin extends upwardly from the flange.

12. The vehicle of claim 11, wherein the closeable storage compartment has a lid that receives the pin when the lid is closed.

13. The vehicle of claim 1, wherein the closeable storage compartment is an armrest assembly.

14. A vehicle comprising:
   a storage compartment including sidewalls defining a cavity, wherein the sidewalls have upper lateral edges that form a rim of the cavity;
   a cupholder; and
   a tray assembly including:
      a tray portion shaped to dock within the cavity and having a floor and opposing lateral sidewalls extending upwardly from the floor and cooperating with the floor to define a tray-portion cavity, each of the sidewalls having a flange extending outwardly therefrom in a lateral direction, and
      a collapsible projection coupled to the floor, the collapsible projection having a collapsed position disposed in the floor and an extended position depending downwardly from the floor, wherein the tray assembly is supported within the cavity via engagement of bottom surfaces of the flanges with the upper lateral edges when in a first position and is docked to the cupholder, via the projection in the extended position and disposed in the cupholder, when in a second position.

15. The vehicle of claim 14, wherein the collapsible projection includes a plurality of interconnected, concentric rings forming a pleated wall.

16. The vehicle of claim 15, wherein the pleated wall includes a topmost ring of the concentric rings attached to a floor of the receptacle and a bottommost ring of the concentric rings.

17. The vehicle of claim 16, wherein the projection is moveable between the collapsed position in which the bottommost ring is disposed radially within the topmost ring to place the cup portion proximate to the floor and the extended position in which the pleated wall is unfolded to have the bottommost ring depend downwardly from the topmost ring.

18. The vehicle of claim 14, wherein the projection resides entirely within the floor when in the collapsed position.

19. The vehicle of claim 14, wherein the projection has a frustoconical shape when in the extended position.

* * * * *